(12) United States Patent
Lowery et al.

(10) Patent No.: US 9,671,421 B2
(45) Date of Patent: Jun. 6, 2017

(54) MICRO-POSITION GAP SENSOR ASSEMBLY

(71) Applicant: HORIBA STEC, Co., Ltd., Kyoto-shi, Kyoto (JP)

(72) Inventors: Patrick Allen Lowery, Reno, NV (US); John Thomas Dick, Reno, NV (US); Michael Alex Kramer, Sparks, NV (US)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 14/696,163

(22) Filed: Apr. 24, 2015

(65) Prior Publication Data

US 2016/0313141 A1   Oct. 27, 2016

(51) Int. Cl.
| | |
|---|---|
| *G01B 7/14* | (2006.01) |
| *G01P 3/487* | (2006.01) |
| *G01D 5/14* | (2006.01) |
| *G01D 11/24* | (2006.01) |
| *G01F 1/00* | (2006.01) |

(52) U.S. Cl.
CPC .............. *G01P 3/487* (2013.01); *G01D 5/145* (2013.01); *G01D 11/245* (2013.01); *G01F 1/00* (2013.01)

(58) Field of Classification Search
CPC ........ G01D 5/2013; G01D 5/145; G01B 7/14; G01P 3/487

USPC ..................................................... 324/207.22
See application file for complete search history.

(56) References Cited

U.S. PATENT DOCUMENTS

| | | | | |
|---|---|---|---|---|
| 2,298,253 | A * | 10/1942 | Dillman | ........... F16K 1/34 137/505.29 |
| 5,251,871 | A * | 10/1993 | Suzuki | ......... F16K 31/025 137/625.33 |
| 8,704,538 | B2 * | 4/2014 | Grudzien | ........... G01L 9/0048 324/686 |

\* cited by examiner

*Primary Examiner* — Reena Aurora
(74) *Attorney, Agent, or Firm* — Alleman Hall Creasman & Tuttle LLP

(57) ABSTRACT

A micro-position gap sensor assembly including a structural housing and a flexible diaphragm fixedly attached forming a barrier against fluid ingress. The structural housing includes a shaft orthogonally attached to the flexible diaphragm, a first retainer including one or more standoffs, a second retainer, and a parallel plate gap sensor. The parallel gap plate sensor includes a non-contact sensor plate biased against a portion of the first retainer defining a plane of the non-contact sensor plate and receiving a biasing force in opposition of the first retainer from the second retainer, a target plate comprised of a conductive paramagnetic material. The parallel plate gap sensor is configured such that displacement of one of the target plate or the non-contact sensor plate changes a distance between the target plate and the non-contact sensor plate.

21 Claims, 7 Drawing Sheets

MICRO-POSITION GAP SENSOR ASSEMBLY

BACKGROUND

With the ever present drive to miniaturize modern technology, one great challenge facing engineers is developing devices of ever smaller proportions that can operate reliably with high precision, in sometimes harsh environments. It may be desirable to provide such devices with small scale moving components such as actuators, position detectors, vibrations detectors, flow sensors, or detectors for small surface defects having displacements on the sub-millimeter or even sub-micrometer scale. However, it is difficult to equip such components with sensor systems that reliably measure such small displacements at these scales. It is also particularly difficult to do so with a sensor system that exhibits high signal to noise ratio across an entire range of displacement. Flow sensors and other devices for measuring fluids also present the additional engineering challenge of inhibiting exposure of the sensor and associated electrical circuitry to potentially corrosive fluids; therefore, there must be a physical barrier such as a non-permeable membrane between any sensors and the fluid media.

Additionally, flow sensors may be coupled to flow control valves. In this application, the flow sensor may be used to control the flow of fluid through a flow control valve. One well known type of flow control is mass flow control. In mass flow control, the flow sensor measures the mass flow of a fluid through a flow passage and then adjusts an associated flow control valve on the flow passage to cause the measured mass flow rate to trend toward a set point. Thus, in mass flow control, the mass flow rate of fluid through the system is constantly measured and used to adjust the flow control valve and thus to adjust the mass flow rate. It will be appreciated that mass flow control is subject to overshooting and undershooting the set point for the mass flow rate. To minimize the magnitude of the overshoots and undershoots, mass flow control systems are typically configured to adjust the flow control valve position slowly and/or incrementally. Therefore, one drawback to mass flow control systems is that they are generally slow to respond to sudden changes in the measured mass flow rate of the system. In circumstances in which nearly instantaneous change in flow rate is desired, mass flow control systems can lack sufficient responsiveness.

SUMMARY

To address the above challenges, a micro-position gap sensor assembly is disclosed. The disclosed micro-position gap sensor may include a structural housing and a flexible diaphragm fixedly attached at a first end of the structural housing forming a barrier against fluid ingress into the structural housing. The structural housing of the micro-position gap sensor assembly may include a shaft orthogonally attached to the flexible diaphragm, a first retainer, a second retainer, and a parallel plate gap sensor between the first retainer and the second retainer. The parallel gap plate sensor may include a non-contact sensor plate, the non-contact sensor plate biased at a first side against a portion of the first retainer defining a plane of the non-contact sensor plate and biased against the second retainer, and a target plate comprised of an electrically conductive material, wherein the target plate is configured such that a plane of the target plate is parallel to the plane of the non-contact sensor plate. The parallel plate gap sensor may be configured such that displacement of one of the target plate or the non-contact sensor plate caused by movement of the shaft, changes a distance between the target plate and the non-contact sensor plate.

In a first aspect of the present disclosure, the micro-position gap sensor assembly may be configured with the shaft orthogonally attached to flexible diaphragm, a first retainer including one or more standoffs, a second retainer, and a parallel plate gap sensor between the first and second retainer. The non-contact sensor plate may be biased on a top side against the one or more downward oriented standoffs of the first retainer. The non-contact sensor plate may be biased at a bottom side against the second retainer. The target plate may be fixedly attached to the shaft such that a plane of the target plate is parallel to the plane of the non-contact sensor plate and such that small displacements of the shaft may change a distance between the target plate and the non-contact sensor plate. A printed circuit board may be coupled to the non-contact sensor plate and configured to output a signal indicating the distance between the non-contact sensor plate and the target plate.

In this first aspect of the present disclosure, the non-contact sensor plate may include one or more sensing sensor regions within a high strength alloy or ceramic plate. Further, the target plate may be similarly configured with the electrically conductive material bonded to a high strength alloy or ceramic plate to reduce the possibility of plastic deformation of the non-contact sensor plate and target plate due to compression forces applied during assembly and operation of the micro-position gap sensor assembly.

In a second aspect of the present disclosure an alternative configuration of the micro-position gap sensor assembly is disclosed. In this second aspect, the structural housing, flexible diaphragm, and shaft are oriented such that the shaft is vertical and centered within the structural housing. However, unlike the first aspect, the first retainer may be configured with one or more standoffs extending upward around the target plate to bias against the non-contact sensor plate. Target plate may be fixedly attached to the shaft and may include a sleeve electrically isolating the conductive paramagnetic regions of the target plate from the shaft. As in the first aspect, printed circuit board may be physically and electrically coupled to non-contact sensor plate. The second retainer may then be positioned between non-contact sensor plate and a wave compression spring ring. In this aspect, the wave compression spring ring may be compressed by a cap threaded into structural housing. A jam retainer may be fixedly attached to shaft.

In a third aspect of the present disclosure, the micro-position gap sensor assembly may be coupled to a prime mover or actuator and a flow control valve. A prime mover housing may be coupled to the non-contact sensor assembly and may house a prime mover or actuator element, a bearing, a actuator return spring compression member, a second retainer, and, optionally, a locking spring for the prime mover housing. The micro-position gap sensor assembly may be configured such that the bearing may mechanically couple the prime mover or actuator element to the actuator return spring compression member. The actuator return spring compression member may be attached to the shaft of the micro-position gap sensor assembly.

The structural housing of the micro-position gap sensor array may include a top body piece and a bottom body piece. The structural housing may include one or more gap adjustment shims between the top body piece and the bottom body piece when assembled to establish a gap between the target plate and the non-contact sensor plate. Further, the target plate may be attached to a bottom side of top body piece.

The top body piece may be installed into the bottom body piece applying a downward compressive force on a first retainer. A portion of the first retainer may bias against a first side the non-contact sensor plate. The non-contact sensor plate may be configured such that the plane of the non-contact sensor plate is parallel to the plane of the target plate and such that displacements of the shaft may move the non-contact sensor plate, thereby changing the distance between the target plate and the non-contact sensor plate. Additionally, an upward biasing force is transmitted from the second retainer through the actuator return spring compression member and shaft to the non-contact sensor plate as discussed above the non-contact sensor plate may be physically and/or electrically coupled to the non-contact sensor plate.

In some aspects, the disclosed micro-position gap sensor assembly may be coupled to a flow control valve. When so coupled, the disclosed micro-position gap sensor assembly may provide the advantage of yielding an accurate and thermally stable indication of the position of the flow control valve. Such a configuration also provides the advantage of directly measuring the position of the valve. Therefore, if desired, the micro-position gap sensor assembly may be used to command a calculated flow rate without using flow control techniques that rely upon feedback control to trend toward a set point, such as mass flow control. Rather, the disclosed micro-position gap assembly can be used to nearly instantaneously command changes in flow rate. The commanded flow rate is achieved by calculating the opening position of the valve required at a current measured pressure in the flow passage to yield the desired flow rate, and then commanding the valve to move to the calculated valve position, while confirming the valve position through the accurate micro-position gap sensor assembly described herein. Such direct control may be used to make nearly instantaneous changes to the flow rate of the fluid within the system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
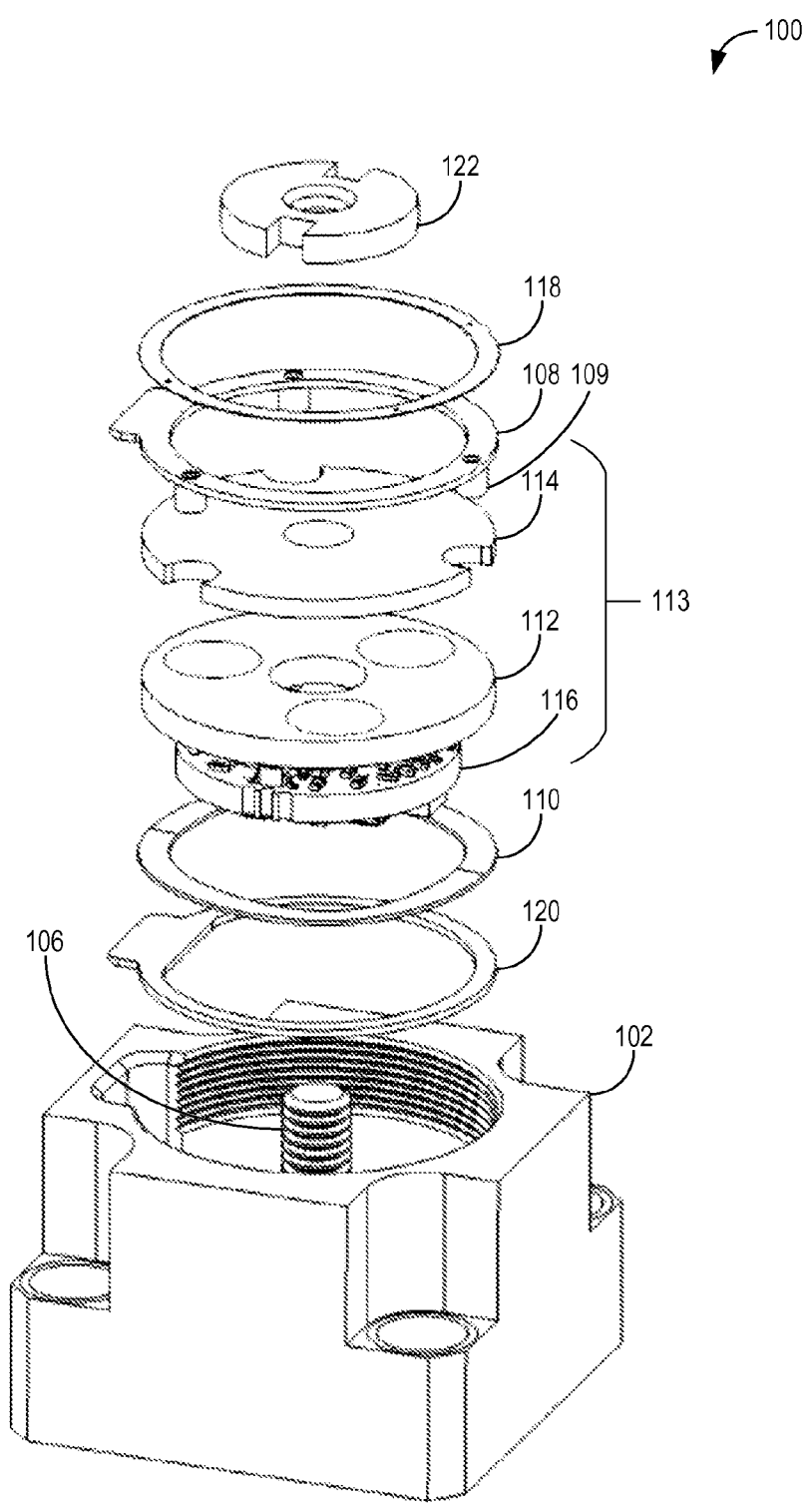
FIG. 1 illustrates an isometric exploded view of a micro-position gap sensor assembly in accordance with a first embodiment of the present disclosure.
Figure 2:
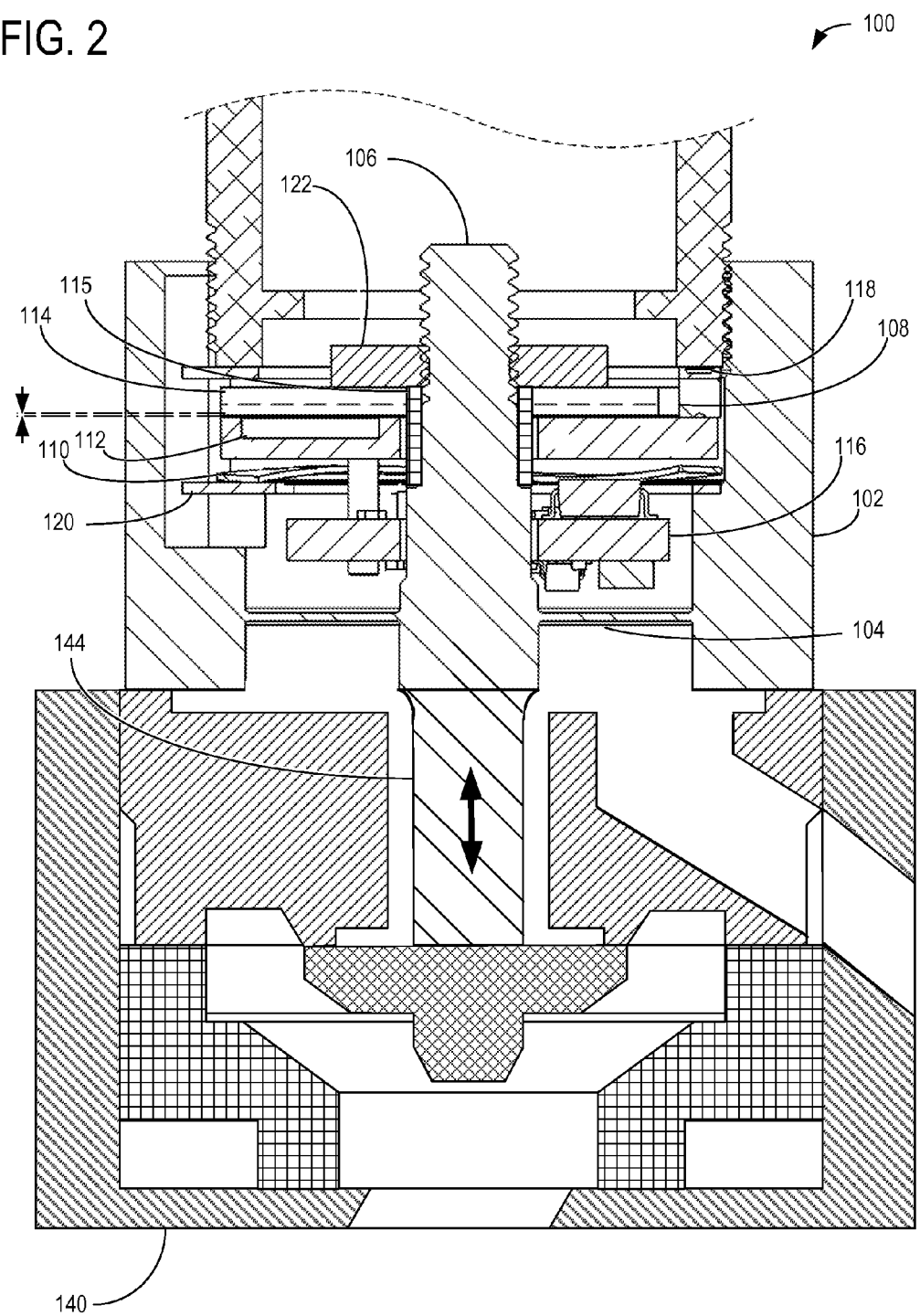
FIG. 2 illustrates a cross sectional view of the micro-position gap sensor assembly of FIG. 1.
Figure 3:
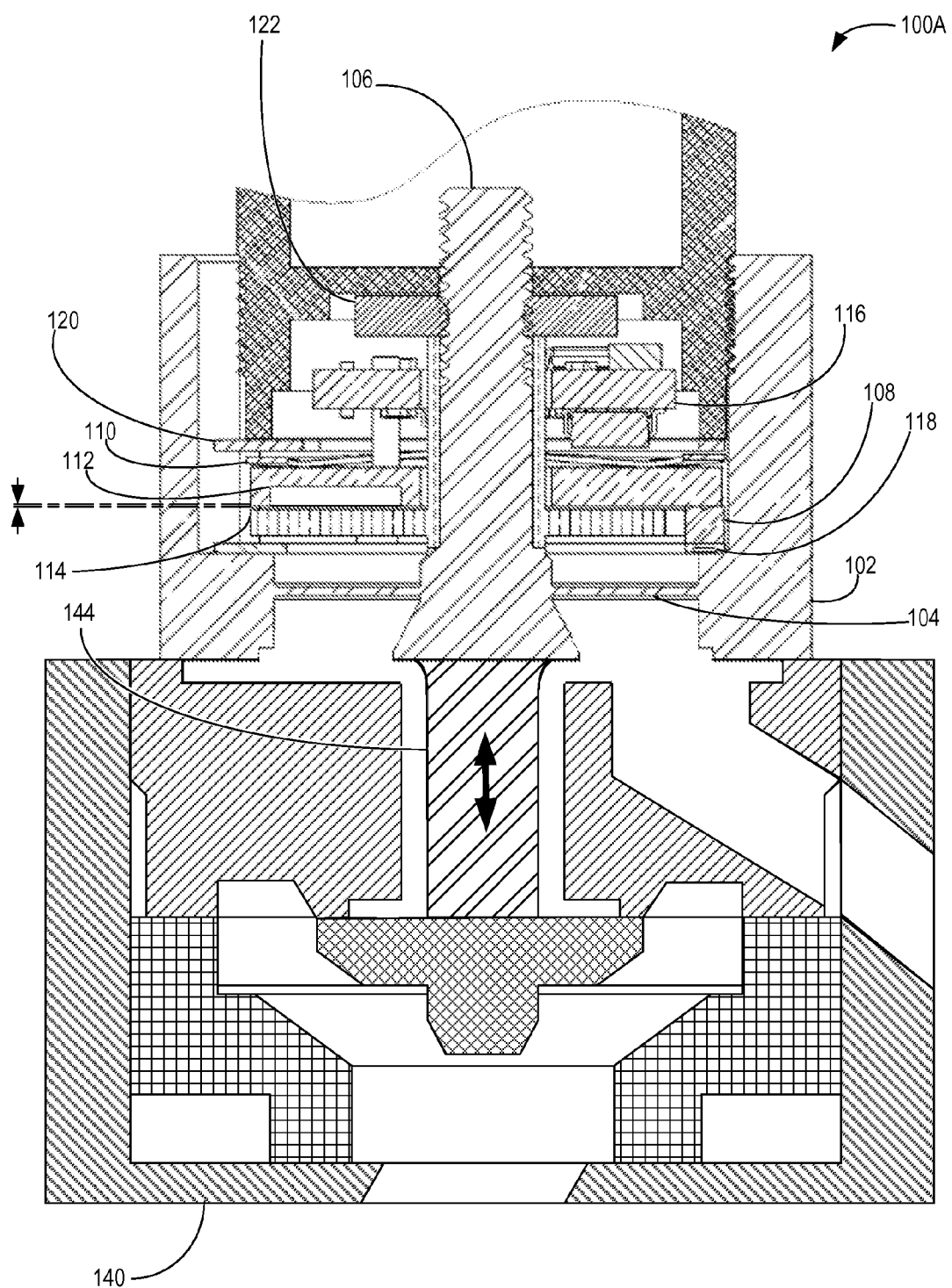
FIG. 3 illustrates a cross sectional view of a micro-position gap sensor assembly in accordance with a second embodiment of the present disclosure.

Disclosed herein is a micro-position gap sensor assembly, a first embodiment of which is illustrated in FIGS. 1-2 at 100, and second embodiment of which is illustrated in FIG. 3. Turning to the first embodiment, the micro-position gap sensor assembly 100 illustrated in FIGS. 1-2 includes a structural housing 102 with a flexible diaphragm 104 fixedly attached at a first end of the structural housing 102.

The structural housing 102 may be configured to house the internal components of micro-position gap sensor assembly 100. The structural housing 102 may be configured to maintain the internal components isolated from exposure to fluids or other elemental factors. Micro-position gap sensor assembly 100 may include a cap at one end to isolate the internal components from non-system environmental factors. Further, structural housing 102 may be constructed of a stainless steel alloy or other suitable material.

The structural housing 102 and flexible diaphragm 104 may collectively form a barrier against fluid ingress into the structural housing. Within structural housing 102, the micro-position gap sensor assembly 100 includes a shaft 106 orthogonally attached to flexible diaphragm 104, a first retainer 108 including one or more standoffs 109, a second retainer 110, and a parallel plate gap sensor between the first retainer 108 and the second retainer 110. The parallel plate gap sensor may be comprised of a non-contact sensor plate 112 biased at a first side against the one or more standoffs of first retainer 108 defining a plane of the non-contact sensor plate 112 and biased at a second side of the non-contact sensor plate 112 against the second retainer 110 and a target plate 114. Target plate 114 may be comprised of a conductive material and may be fixedly attached to the shaft 106 such that a plane of the target plate 114 is parallel to the plane of the non-contact sensor plate 112. The parallel plate gap sensor may also include a printed circuit board 116 coupled to the non-contact sensor plate 112. Printed circuit board 116 may be configured to output a signal indicating a distance between the non-contact sensor plate 112 and the target plate 114.

The configuration of the parallel plate gap sensor may allow small displacements of the shaft 106 within the structural housing 102 to change a distance between the target plate 114 and the non-contact sensor plate 112. This printed circuit board 116 may then output a signal indicating the change in distance. Thus, the configuration of the micro-position gap sensor assembly 100 may provide the advantage of providing a high resolution measurement at the sub-millimeter scale while protecting the sensing components from fluid exposure and/or adversely affecting flow characteristics of the fluid system being measured. Further, the configuration of the micro-position gap sensor assembly 100 may be applicable in many applications including, but not limited to, valve position indication, fluid flow sensing, vibration sensing, prime mover performance, or mechanical defect detection.

FIG. 2 illustrates a cross sectional view of the micro-position gap sensor assembly 100. Flexible diaphragm 104 may be circular, and attached to the structural housing around its entire circumference, forming a fluid-tight seal. Thus, collectively flexible diaphragm 104 and structural housing 102 may form a barrier against fluid ingress into the structural housing. Flexible diaphragm 104 may be formed separately from structural housing 102 and then welded or otherwise secured in place. In other embodiments, flexible diaphragm 104 and structural housing 102 may be formed, e.g., by machining, a single integral unit. Flexible diaphragm 104 may be formed of a flexible alloy or other suitable material. Flexible diaphragm 104 may be configured with a maximum displacement of less than 0.100 millimeters and to provide a resolvable displacement of approximately 0.010 millimeters, in one example.

Returning to FIG. 1, as described above the internal components of micro-position gap sensor assembly 100 may include shaft 106, first retainer 108 including one or more standoffs, second retainer 110, and a parallel plate gap sensor 113 between the first retainer 108 and second retainer 110. The parallel plate gap sensor 113 may comprise a non-contact sensor plate 112, a target plate 114, and a printed circuit board 116 coupled to the non-contact sensor plate 112.

Shaft 106 may be orthogonally attached to the flexible diaphragm. Shaft 106 may extend through a center hole in flexible circuit board 116 and non-contact sensor plate 112. Target plate 114 may be fixedly attached to shaft 106. Shaft 106 may be comprised of a metal alloy with a thermal expansion coefficient matching the material of structural housing 102. In some embodiments, shaft 106 may be threaded allowing target plate 114 to be installed by threading the target plate in place. It will be understood that while the shaft 106 may extend through the center hole within each of non-contact sensor plate 112 and printed circuit board 116, non-contact sensor plate 112 and printed circuit board 116 are not fixedly attached to shaft 106. This configuration allows displacement of shaft 106 and fixedly attached target plate 114 to change the distance between target plate 114 and non-contact sensor plate 112. The cause of the displacement of shaft 106 may be due to the specific application to which micro-position gap sensor assembly 100 is applied.

In a first non-limiting example, shaft 106 may be coupled to a prime mover (not shown) such as a solenoid, piezoelectric actuator, or micro-stepper motor, for use in, for example, a solenoid-actuated or piezo-electrically actuated valve. In this specific application, the actuation of the prime mover of the valve will result in displacement of shaft 106. The resultant change in distance between target plate 114 and non-contact sensor plate 112 may be detected by one or more sensor regions within non-contact sensor plate 112. Printed circuit board 116 may then output a signal indicating the change in distance to a control system for the valve.

In a second non-limiting example, micro-position gap sensor assembly 100 may be applied in a flow sensing circuit. In this example, micro-position gap sensor assembly 100 may be oriented such that flexible diaphragm 104 is facing a fluid or 'wet' side of a fluid flow circuit. Flow of the fluid and/or pressure transients of the fluid within the fluid flow circuit may cause deflections of flexible diaphragm 104. As shaft 106 is orthogonally attached to flexible diaphragm 104, these deflections will result in displacement of shaft 106 within structural housing 102. The changes in the distance between target plate 114 and non-contact sensor plate 112 will be indicated by the signal provided by printed circuit board 116.

Other embodiments may include coupling shaft 106 to a mechanical probe for detection of micro-surface defects in a micrometer type application, or for use in vibration detectors. It will be appreciated that the configuration of micro-position gap sensor assembly 100 may maintain the internal components isolated from the system in which micro-position gap sensor assembly 100 is applied. Thus, the configuration may provide for high resolution, sub-millimeter/sub-micrometer measurements and the generation of a low noise and accurate signal indicating these measurements.

Returning to FIG. 1, non-contact sensor plate 112 may be configured to bias against the one or more standoffs of the first retainer 108. First retainer 108 may be configured as a standoff washer including three or more standoffs configured to bias against the non-contact sensor plate 112. First retainer 108 may be further configured with a key tab. The key tab of first retainer 108 may be configured to fit a slot within an interior wall of structural housing 102 and resist rotational torque applied to the first retainer during assembly of micro-position gap sensor assembly 100. It will be appreciated that first retainer 108 may be configured as a standoff washer. Alternatively, the standoff washer may have fewer than three standoffs, or another suitable retaining structure may be provided configured to bias against non-contact sensor plate 112. First retainer 108 may be aligned within structural housing 102 through the addition of one or more adjustment shims 118. One or more adjustment shims 118 may be added as required during assembly to ensure first retainer 108 is properly oriented such that the one or more standoffs of first retainer 108 may define a plane of non-contact sensor plate 112 within structural housing 102. It will be appreciated that the first retainer 108 may define the plane of the non-contact sensor plate 112 such that it is parallel to the base of structural housing 102. The shims 118 are used to adjust the gap to a desired level, by inserting one or more shims 118 of appropriate thickness to adjust the gap to a desired distance.

Non-contact sensor plate 112 may also bias against second retainer 110 at a second side of non-contact sensor plate 112. It will be appreciated that first retainer 108 and second retainer 110 bias non-contact sensor plate 112 on opposite sides to prevent motion of non-contact sensor plate within structural housing 102. Second retainer 110 may include a wave washer, which may have, for example, three or more wave peaks configured to bias against the non-contact sensor plate at each wave peak. Alternatively, another number of wave peaks may be used. It will be appreciated that second retainer 110 may also include wave washers with fewer than three wave peaks or any other suitable retainer configured to bias against non-contact sensor plate 112. A wave compression spring ring 120 may be configured to bias against second retainer 110 and structural housing 102.

Shaft 106, first retainer 108, and second retainer 110 may be comprised of paramagnetic materials with similar thermal expansion coefficients as the material comprising structural housing 102. Thus, first retainer 108 and second retainer 110 may maintain the planar orientation, prevent vertical motion of the non-contact sensor plate 112 within structural housing 102, and may prevent changes to the distance between target plate 114 and non-contact sensor plate 112 due to thermal expansion or contraction of micro-position gap sensor assembly 100.

Non-contact sensor plate 112 may include one or more sensing regions within non-contact sensor plate 112. Each sensing region may include a sensing coil configured to operate as a capacitance, magnetic field sensing, eddy current, or any other suitable sensor configured to sense a distance between non-contact sensor plate 112 and target plate 114. Each sensing region may be electrically connected to printed circuit board 116. In some embodiments, the non-contact sensor plate may include one or more sensing sensor regions within a high strength alloy or ceramic plate. In these embodiments, non-contact sensor plate may resist plastic deformation due to compression forces applied during assembly and operation of the micro-position gap sensor assembly.

Target plate 114 may be comprised of a conductive and paramagnetic material and fixedly attached to shaft 106, with or without a high-strength support member bonded to it. Target plate 114 may be oriented such that a plane of target plate 114 is parallel to the plane of non-contact sensor plate 112. Further, target plate 114 may be oriented such that a small distance or gap (indicated by the dashed lines and arrows in FIGS. 2 and 3) is maintained between target plate 114 and non-contact sensor plate 112. This configuration allows any displacement of the shaft 106 within structural housing 102 to change the distance between target plate 114 and non-contact sensor plate 112. This change in distance may be detected by sensing regions within the non-contact sensor plate 112.

Target plate 114 may be configured to be threaded, glued, or fixedly attached by any other suitable fixed connection onto shaft 106. Further, target plate 114 may include a non-conductive sleeve 115 to electrically isolate the conductive material of target plate 114 from shaft 106. Non-conductive sleeve 115 may be comprised of ceramic, hardened tool steel, or any other suitable non-conductive material with a material hardness greater than that of the conductive material of target plate 114. The conductive material of target plate 114 may be bonded to non-conductive sleeve 115 by press fitting, welds, brazing, or any other suitable bonding process. Target plate 114 may be further configured to accommodate passage of the one or more standoffs of first retainer 108 through or around target plate 114 and to non-contact sensor plate 112 as illustrated in FIG. 1.

In some embodiments, target plate 114 may be bonded to a high strength alloy or ceramic plate to reduce the possibility of plastic deformation due to compression forces applied during assembly and operation of the micro-position gap sensor assembly.

Printed circuit board 116 may be coupled to non-contact sensor plate 112. In some embodiments, printed circuit board 116 may be physically and electrically coupled to non-contact sensor plate 112 forming a single assembly. In other embodiments, printed circuit board 116 may only be electrically coupled to non-contact sensor plate 112, thus allowing printed circuit board 116 to be alternatively located within structural housing 102 (as illustrated in FIGS. 2 and 3).

Printed circuit board 116 may be configured to output a signal indicating the distance between the non-contact sensor plate 112 and target plate 114. The signal may be output via wiring, optical cables, or any suitable means to a control system or other indication system. Printed circuit board 116 may include an oscillation circuit. Printed circuit board 116 may also include a temperature sensor or temperature IC to compensate for local temperature for electronic temperature correction of output signal due to temperature drift of circuit components. It will be appreciated that printed circuit board 116 may include analog to digital conversion circuits to increase the quality of the output signal. It will be further appreciated that the oscillation circuit within printed circuit board 116 may be electromagnetically shielded by the material of the structural housing 102, thus interference from external electromagnetic sources may be minimized.

Micro-position gap sensor assembly may also include a jam retainer 122 configured to fixedly attach to the shaft. Jam retainer 122 may include a retaining nut or spring clip configured to secure target plate 114 to shaft 106.

A compression force may be applied to first retainer 108 by a valve housing or an upper housing or cap of structural housing 102. This compression force may be transmitted to non-contact sensor plate 112 through the one or more standoffs of first retainer 108.

FIG. 2 illustrates a cross sectional view of the of micro-position gap sensor assembly 100 of the first embodiment. In this first embodiment, the internal components of micro-position gap sensor assembly 100 may be oriented and function as follows. In this embodiment, structural housing 102, flexible diaphragm 104, shaft 106 are oriented such that shaft 106 is vertical and centered within the structural housing 102. Wave compression spring ring 120 is oriented within structural housing 102 such that it bears on an internal ledge within structural housing 102. A key tab on wave compression spring ring 120 may fit a slot within an interior wall of structural housing 102 to resist rotational torque forces that may be imparted to the internal components of micro-position gap sensor assembly 100 during assembly. Second retainer 110 may be oriented to bias against the wave compression spring ring 120 such that a force from wave compression spring ring 120 may be transmitted upward to non-contact sensor plate 112.

Non-contact sensor plate 112 may be coupled to printed circuit board 116 and may be oriented within structural housing such that shaft 106 passes through the center hole of each. Further, non-contact sensor plate 112 may be oriented such that the non-contact sensor plate 112 is biased against second retainer 110 below. In this configuration, wave compression spring ring 120 may push upward against second retainer 110 which transmits the force to non-contact sensor plate 112.

Target plate 114 may be fixedly attached to shaft 106 such that a gap (indicated by the dashed lines and arrows) exists between target plate 114 and non-contact sensor plate 112. Target plate 114 is further oriented in a planar orientation that is parallel to the plane of non-contact sensor plate 112. Target plate 114 may be configured to travel with displacement of shaft 106 such that a distance between target plate 114 and non-contact sensor plate may range from 50 micrometers to 200 micrometers and such that target plate 114 may not physically contact non-contact sensor plate 112.

The one or more standoffs of first retainer 108 may extend downward to bias against and define the plane of non-contact sensor plate 112. The standoffs may project downward around target plate 114 or through openings in the target plate 114 as illustrated. First retainer 108 may be aligned within structural housing 102 by a key tab similar to wave compression spring ring 120. Optionally, one or more adjustment shims 118 may be placed above first retainer to ensure the plane of first retainer 108 is perpendicular to the centerline axis of shaft 106. This configuration may ensure that the non-contact sensor plate 112 is maintained parallel to target plate 114. As discussed above, the opposing upward and downward forces applied by second retainer 110 and first retainer 108 may maintain the orientation of non-contact sensor plate 112 during thermal expansion and contraction of structural housing 102 and/or shaft 106. Furthermore, the opposing forces may prevent changes in the distance between target plate 114 and non-contact sensor plate 112 due to thermal expansion or contraction thereby limiting thermal effect associated error in the output signal.

For example, as target plate 114 is fixedly attached to shaft 106, thermal expansion or contraction of shaft 106 may cause a change in the distance between target plate 114 and non-contact sensor plate 112. However, the opposing biasing forces from first retainer 108 and second retainer 112 may thermally balance parallel plate gap sensor 113 to offset the thermal expansion of shaft 106. Upon thermal expansion of shaft 106, the biasing force from second retainer 110 may cause non-contact sensor plate 112 to move toward target plate 112, thereby offsetting any increase of the distance between non-contact sensor plate 112 and target plate 114. It will be appreciated that to maintain the gap in the parallel plate gap sensor 113 one of first retainer 108 and second retainer 110 is configured with elastic properties that bias one of the plates and the other of first retainer 108 and second retainer 110 is fixedly coupled to the shaft and configured to cause the other of the plates to move with the shaft.

The downward force exerted upon non-contact sensor plate 112 from the one or more standoffs of first retainer 108 may originate from a compression force applied by the valve housing. As discussed above, valve housing may apply a compressive force downward on the internal components of micro-position gap sensor assembly 100. In this configuration, the downward compressive force upon non-contact sensor plate 112 may be opposed by an upward force from compression spring ring 120. This opposing force configuration allows non-contact sensor plate 112 to float within structural housing 102 while maintaining a substantially horizontal (parallel to flexible diaphragm 104 and orthogonal to shaft 106) planar orientation.

Micro-position gap sensor assembly 100 may be coupled to a flow control valve 140 as illustrated. Displacement of shaft 106, by a prime mover (not shown) coupled to shaft 106, for example, may effect displacement of valve shaft 144. Displacement of valve shaft 144 may change a position of the valve body part relative to a valve seat of the flow control valve. The change in position of the valve body part may effect a change in the rate of fluid flow through flow control valve 140. Flow control valve 140 is illustrated as having a normally closed configuration, in which the valve body part is biased against a spring holding the valve body part biased against the valve seat preventing fluid flow through flow control valve 140. A displacement of shaft 106 away from the valve seat may move the valve body part away from the valve seat creating a path for fluid flow through flow control valve 140.

It will be appreciated that alternative configurations of flow control valve 140 may be employed. For example, a normally open configuration flow control valve 140 may be coupled to micro-position gap sensor assembly 100. In this alternative configuration, the valve body part may be biased against a spring preventing the valve body part from biasing against the valve seat. Therefore, shaft 106 may be displaced toward the valve seat overcoming the spring force to bias the valve body part against the valve seat closing the fluid flow path through flow control valve 140.

As discussed above the displacement of shaft 106 may change the distance between non-contact sensor plate 112 and target plate 114. Printed circuit board 116 may provide a signal indicating the distance between non-contact sensor plate 112 and target plate 114 to a flow control system. Therefore, micro-position gap sensor assembly 100 may indicate a position of flow control valve 140 to the flow control system. The flow control system may calculate an accurate flow rate of fluid through flow control valve 140 from the fluid pressure of the system, thereby enabling accurate control of fluid flow within the system and rapid adjustment of the fluid flow. In other words, the flow control valve position measured by micro-position gap sensor assembly 100 may be employed in a valve-position feedback control method.

Although in the first embodiment target plate 114 is fixedly coupled to the shaft 106 and located above non-contact sensor plate 112 that is biased upward, it will be appreciated that the positions of the target plate 114 and non-contact sensor plate 112 may be switched in this embodiment, such that the target plate 114 is located below the non-contact sensor 112 and biased upward, while the non-contact sensor 112 is located above the target plate 114 and fixedly coupled to the shaft 106.

FIG. 3 illustrates a cross sectional view of the of micro-position gap sensor assembly 100A in a second embodiment. In this second embodiment, the internal components of micro-position gap sensor assembly 100A may be ordered and function as follows. Structural housing 102, flexible diaphragm 104, shaft 106 are oriented such that shaft 106 is vertical and centered within the structural housing 102. However, unlike the first embodiment, adjustment shims 118 may bear upon the internal ledge within structural housing 102. First retainer 108 may then be configured with the one or more standoffs extending upward and around target plate 114. Target plate 114 may be fixedly attached to shaft 106 as described above for the first embodiment. However, it will be recognized that in this second embodiment, target plate 114 is illustrated with a sleeve electrically isolating the conductive paramagnetic regions of target plate 114 from shaft 106. The sleeve may be comprised of ceramic or other non-conductive material. Non-contact sensor plate 112 may then bias against the upward facing one or more standoffs of first retainer 108. As in the first embodiment, printed circuit board 116 may be physically and electrically coupled to non-contact sensor plate 112. The second retainer may then be positioned between non-contact sensor plate 112 and wave compression spring ring 120. In this configuration, wave compression spring ring 120 may be compressed by a cap threaded into structural housing 102 as illustrated. Jam retainer 122 may then be fixedly attached to shaft 106.

Although in the second embodiment target plate 114 is fixedly coupled to shaft 106 and located below non-contact sensor plate 112 that is biased downward, it will be appreciated that the positions of the target plate 114 and non-contact sensor plate 112 may be switched in this embodiment, such that the target plate 114 is located above the non-contact sensor 112 and biased downward, while the non-contact sensor 112 is located below the target plate 114 and fixedly coupled to the shaft 106.

As discussed above with reference to FIG. 2, micro-position gap sensor assembly 100A may be coupled to flow control valve 140.

Figure 4:
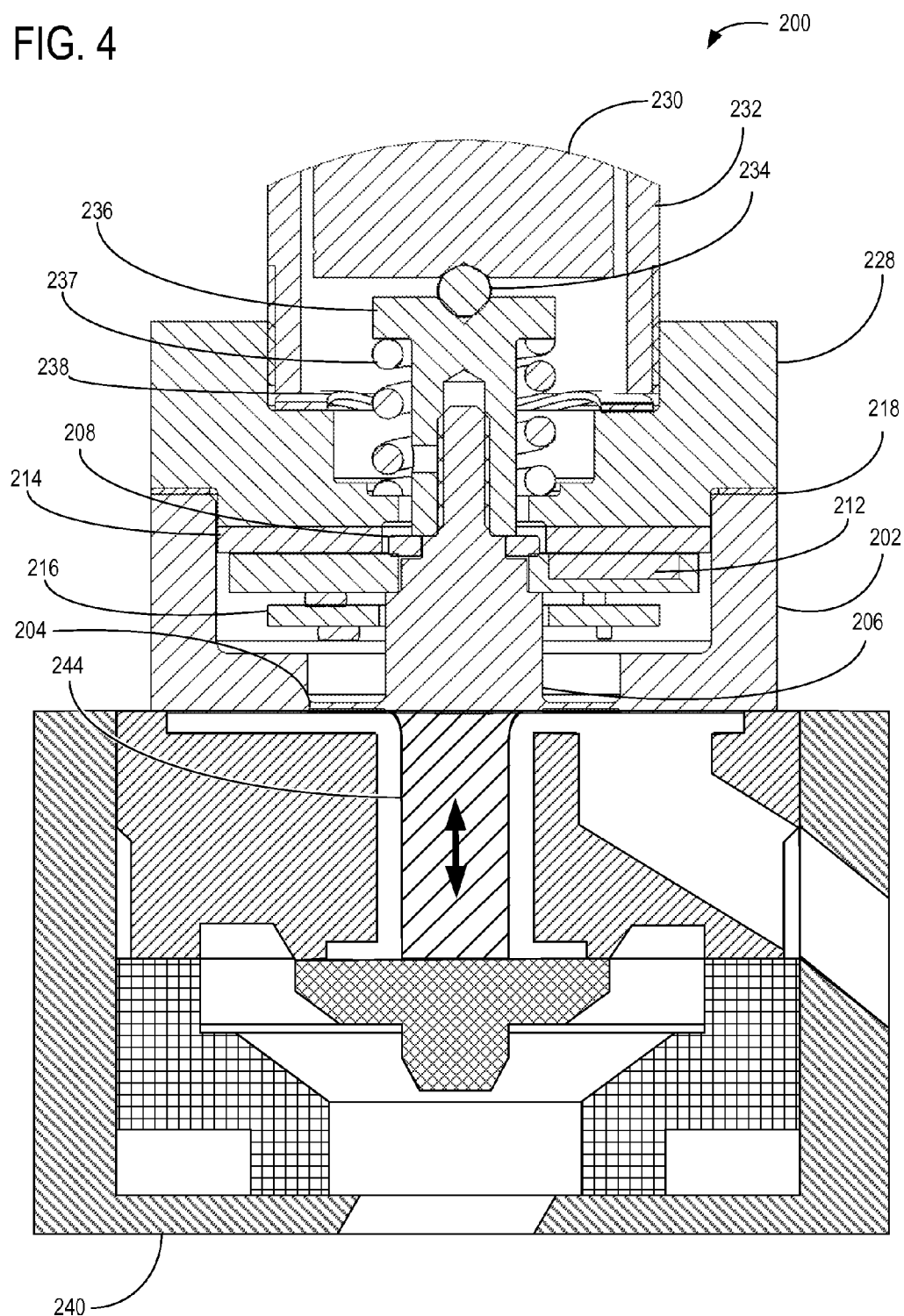
FIG. 4 illustrates a cross sectional view of a micro-position gap sensor assembly in accordance with a third embodiment of the present disclosure.
Figure 5:
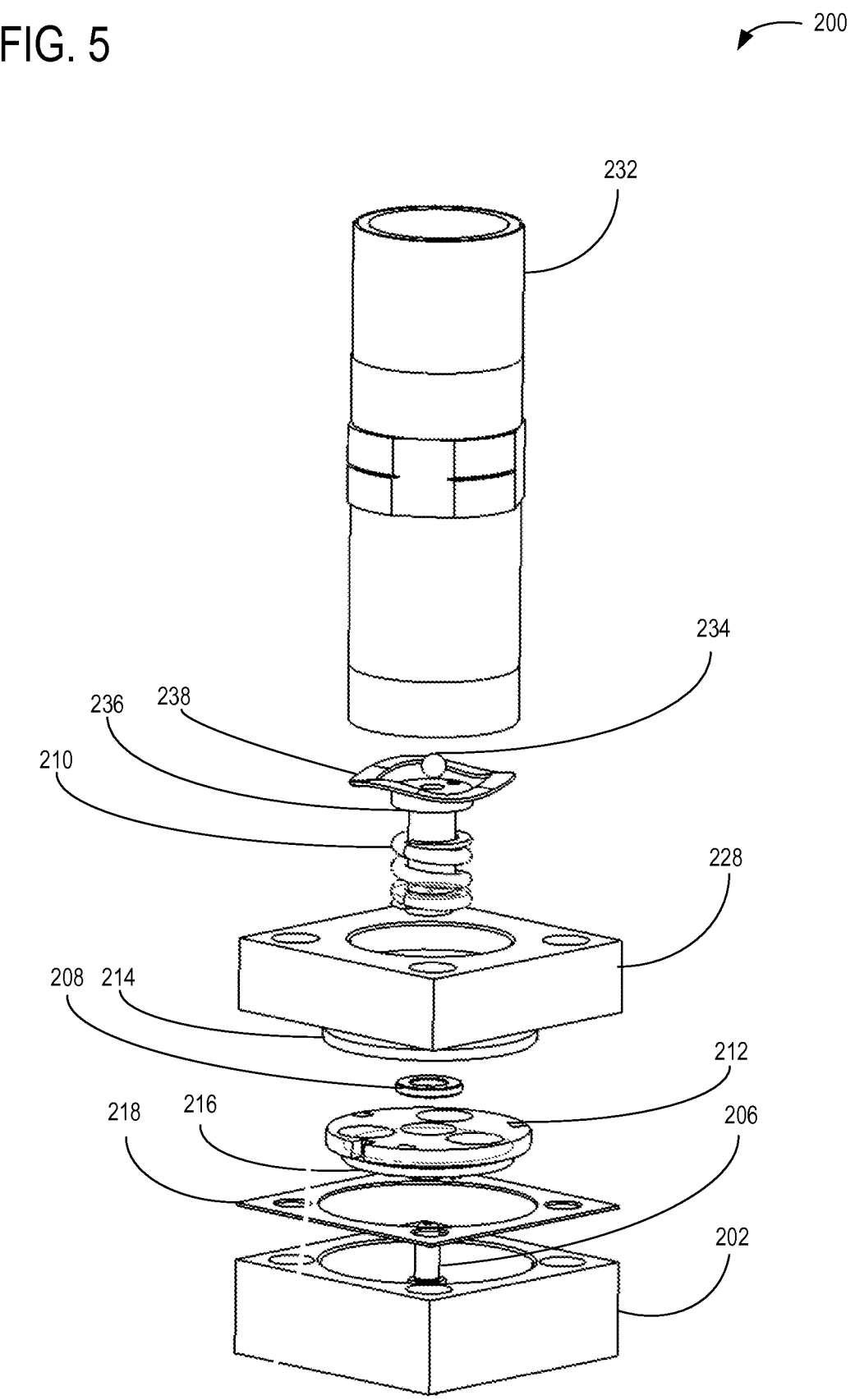
FIG. 5 illustrates an isometric exploded view of the micro-position gap sensor assembly of FIG. 4.

FIGS. 4 and 5 illustrate a third embodiment of micro-position gap sensor assembly 200. FIG. 4 illustrates a cross sectional view of a third embodiment of micro-position gap sensor assembly 200 coupled to a prime mover or actuator and a flow control valve 240. An isometric exploded view of micro-position gap sensor assembly 200 is illustrated in FIG. 5. A prime mover housing 232 may be coupled to micro-position gap sensor assembly 200 housing a prime mover or actuator element 230, bearing 234, actuator return spring compression member 236, an actuator return spring 237, and, optionally, a locking spring for prime mover housing 232. Prime mover housing 232 may optionally be secured in place by a prime mover housing locking ring 238.

Micro-position gap sensor assembly 200 may be configured such that a prime mover or actuator element 230 is coupled to a bearing 234. Bearing 234 may mechanically couple prime mover or actuator element 230 to actuator return spring compression member 236. The mechanical coupling of bearing 234 to actuator return spring compression member 236 may be configured such that prime mover or actuator element 230 may effect a change in the valve position of flow control valve 240.

Actuator return spring compression member 236 may provide a compressive force against actuator return spring 237. Further, actuator return spring compression member 236 may bias against first retainer 208 providing a compressive force against first retainer 208. Actuator return spring compression member 236 may be coupled to shaft 206. In this configuration, actuator return spring 237 may apply a force against actuator return spring compression member 236 such that upon disengagement of prime mover or actuator element 230, the force from actuator return spring 237 may act to reverse the change in valve position of flow control valve 240.

The structural housing of micro-position gap sensor 200 may include a top body piece 228 and a bottom body piece 202. Top body piece 228 may be installed by threading, press fitting or any other suitable method into bottom body piece 202. As described above, the structural housing of micro-position gap sensor assembly 200 may include flexible diaphragm 204. Flexible diaphragm 204 may be fixedly attached or cast as a single piece with bottom body piece 202.

Micro-position gap sensor assembly 200 may include a parallel plate gap sensor supported at a first side by the first retainer 208 and the shelf of shaft 206 and supported at a second side by the structural housing. The parallel plate gap sensor may comprise a non-contact sensor plate 212, a target plate 214, and a printed circuit board 216 coupled to the non-contact sensor plate. Printed circuit board 216 may be configured to output a signal indicating a distance between non-contact sensor plate 212 and target plate 214.

Micro-position gap sensor assembly 200 may include a shaft 206 configured with one or more diameters. Shaft 206 may be configured with a first larger diameter and at least one smaller diameter. The first larger diameter of shaft 206 may step inward to each smaller diameter forming a shelf on shaft 206.

In some embodiments, target plate 214 may be bonded to a bottom side of top body piece 228. As discussed above, target plate 214 may include conductive, paramagnetic material. Target plate 214 may be bonded to top body piece 228 by press fitting, welds, brazing or any other suitable bonding method.

Actuator return compression member 236 may apply a downward compressive force on a first retainer 208. In this embodiment, first retainer 208 may be any of a sensor compression collet, chuck, or any other suitable retainer. A portion of first retainer 208 may bias against a top side of non-contact sensor plate 212.

Non-contact sensor plate 212 may be fixedly attached to shaft 206 such that a plane of non-contact sensor plate 212 is parallel to a plane of target plate 214 and such that small displacements of shaft 206 may move non-contact sensor plate 212, changing the distance between target plate 214 and non-contact sensor plate 212. The distance between non-contact sensor plate 212 and target plate 214 may be established through the use of one or more gap adjustment shims 218 of varying thickness placed between top body piece 228 and bottom body piece 202 of the structural housing.

It will be appreciated that in some configurations, the upward biasing force may comprise a reaction force equal in magnitude and in opposition to the downward compression force applied by actuator return spring compression member 236 through first retainer 208.

As shown in FIG. 4, shaft 206 may include a step or shelf. In this configuration, non-contact sensor plate 212 may bear on the shelf on shaft 206 such that the shelf on shaft 206 may exert an upward force against a bottom surface of non-contact sensor plate 212. Therefore, non-contact sensor plate 212 may bias at a first side against a portion of first retainer 208 and receive a biasing force in opposition to first retainer 208.

Micro-position gap sensor assembly 200 may include a printed circuit board 216. Printed circuit board 216 may be electrically and/or physically coupled to non-contact sensor plate 212 and output a signal proportional to a distance between non-contact sensor plate 212 and target plate 214 as described in the first and second embodiments above.

Shaft 206 may be coupled to valve shaft 244 of flow control valve 240 such that a displacement of prime mover or actuator element 230 may effect a displacement of valve shaft 244 and valve disk 242 relative to the seat of flow control valve 240.

Figure 6:
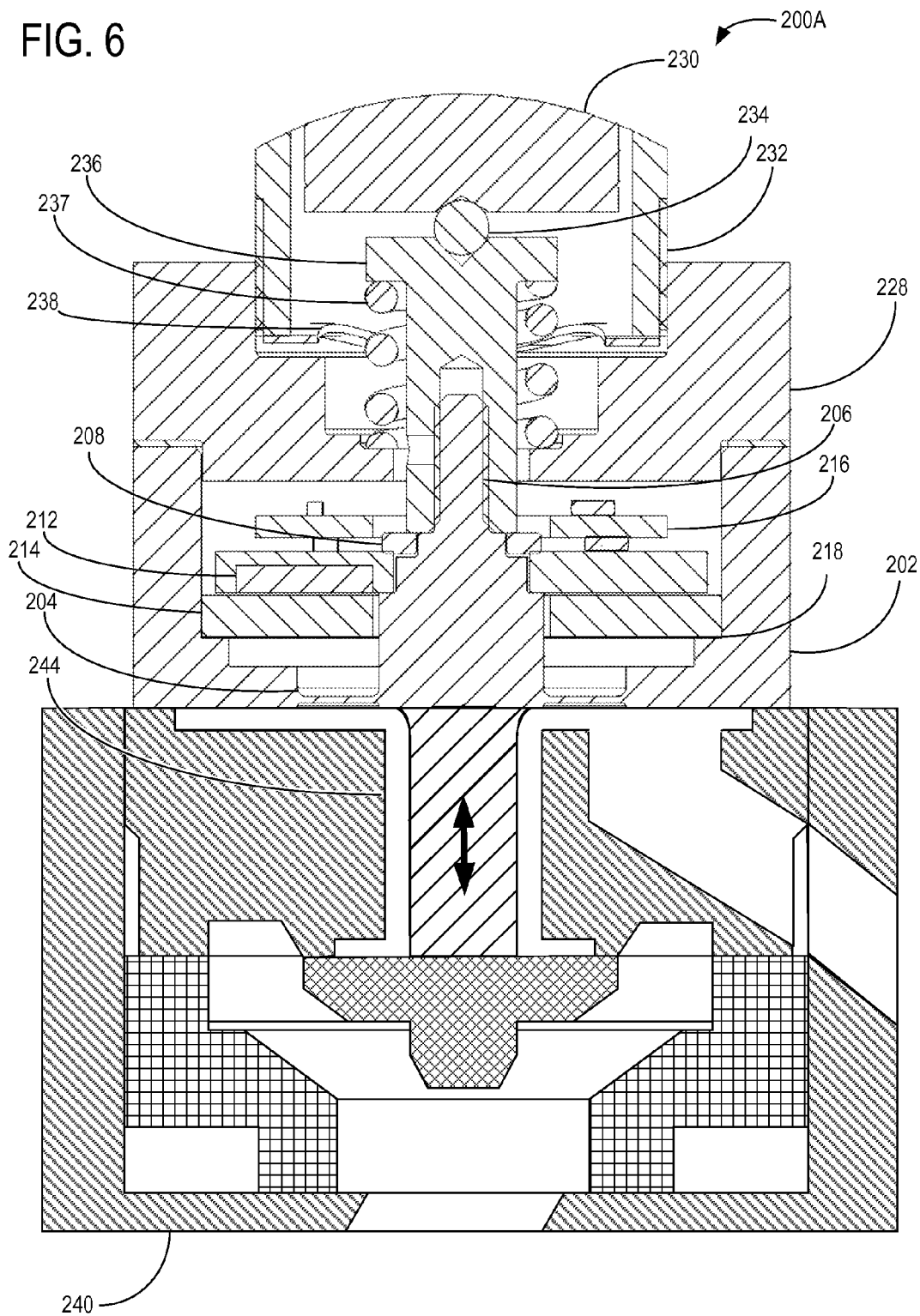
FIG. 6 illustrates a cross sectional view of a micro-position gap sensor assembly in accordance with a fourth embodiment of the present disclosure.
Figure 7:
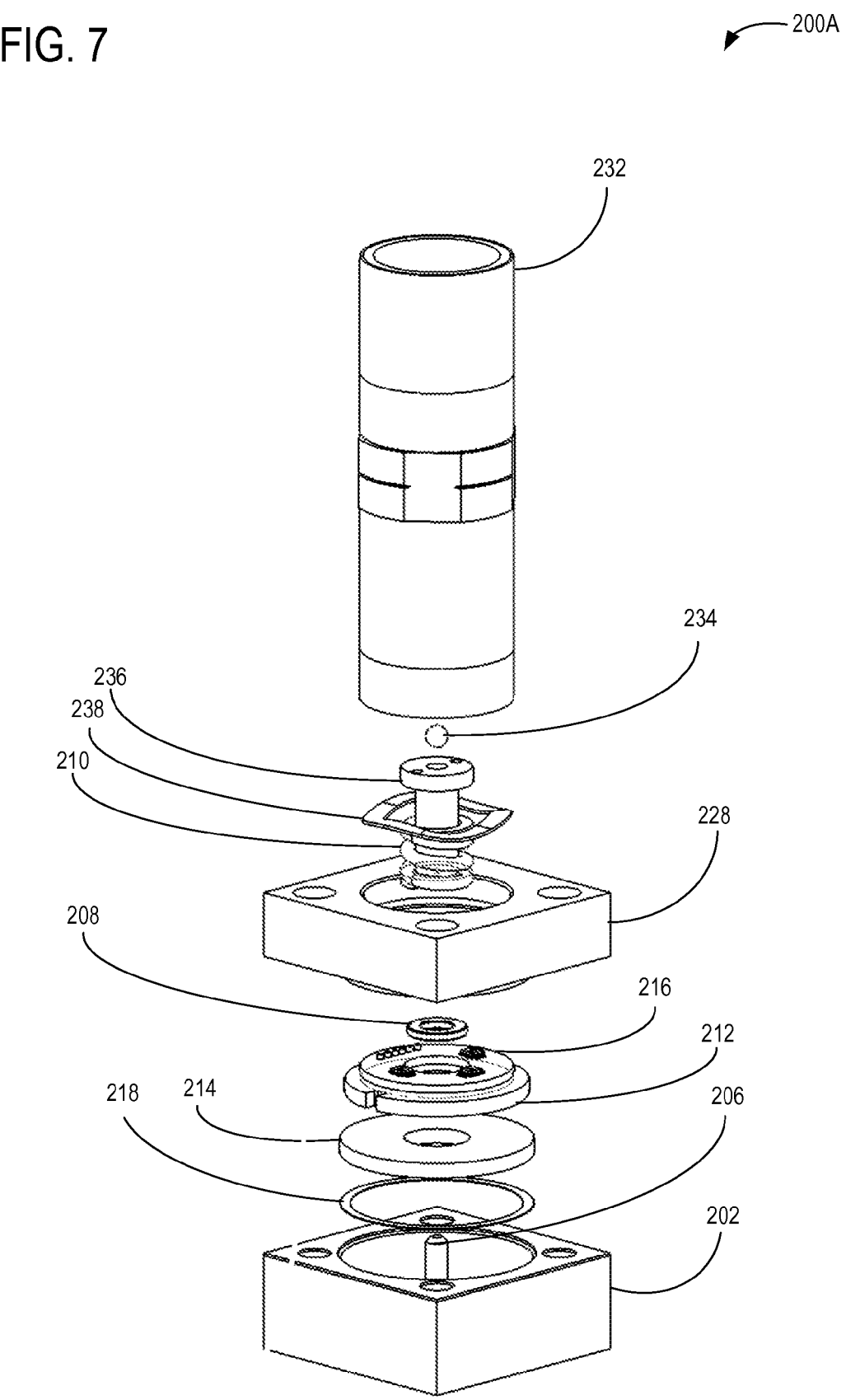
FIG. 7 illustrates an isometric exploded view of the micro-position gap sensor assembly of FIG. 6.

FIGS. 6 and 7 illustrate a fourth embodiment, a reverse configuration of the micro-position gap sensor assembly 200 of FIGS. 4 and 5. FIG. 6 illustrates a cross-sectional view of micro-position gap sensor assembly 200A coupled to a prime mover or actuator and a flow control valve 240. FIG. 7 provides an isometric exploded view of micro-position gap sensor assembly 200A. For the sake of brevity, only the differences between micro-position gap sensor assembly 200A of FIGS. 6 and 7 and micro-position gap sensor assembly 200 of FIGS. 4 and 5 will be discussed.

In the reverse configuration target plate 214 may be located in bottom body part 202. One or more gap adjustment shims may be located between bottom body part 202 and target plate 214 to establish the distance between target plate 214 and non-contact sensor plate 212. As discussed above with reference to FIGS. 4 and 5, non-contact sensor plate 212 may be biased against a portion of first retainer 208 and the biasing force in opposition of first retainer 208 may be applied by a shelf on shaft 206. Further, printed circuit board 216 may be located on a side of non-contact sensor plate 212 opposite target plate 214.

It will be appreciated that although micro-position gap sensor assemblies 200 and 200A have been illustrated with a bearing 234 coupling prime mover or actuator element 230 to actuator return spring compression member 236, any suitable coupling may be used to transmit force from prime mover of actuator element 230 to actuator return spring compression member 236. It will be further appreciated that the type of coupling may be specific to the installed prime mover.

It will be appreciated that the embodiments discussed above may also be applied to flow sensing, vibration sensing, prime mover performance, or mechanical defect detection in addition to the flow control applications described above.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A micro-position gap sensor assembly comprising:
    a structural housing;
    a flexible diaphragm fixedly attached at a first end of the structural housing forming a barrier against fluid ingress into the structural housing;
    a shaft orthogonally attached to the flexible diaphragm;
    a first retainer;

a second retainer; and
a plate gap sensor, the plate gap sensor comprising:
   a non-contact sensor plate, the non-contact sensor plate biased at a first side against a portion of the first retainer and receiving a biasing force in opposition of the first retainer from the second retainer; and
   a target plate positioned adjacent the non-contact sensor plate and separated therefrom by a gap;
   wherein the plate gap sensor is configured such that one of the target plate or non-contact sensor plate is coupled to the shaft and is configured to move with movement of the shaft, and wherein displacement of the one of the target plate or the non-contact sensor plate caused by movement of the shaft changes a distance between the target plate and the non-contact sensor plate, and wherein the biasing force biases the other of the target plate and non-contact sensor to thereby maintain the gap during the displacement.

2. The micro-position gap sensor assembly of claim 1, further comprising:
a printed circuit board coupled to the non-contact sensor plate, the printed circuit board configured to output a signal indicating a distance between the non-contact sensor plate and the target plate.

3. The micro-position gap sensor assembly of claim 1, wherein the target plate is comprised of a conductive and paramagnetic material and a ceramic sleeve configured to electrically isolate the conductive and paramagnetic material from the shaft.

4. The micro-position gap sensor assembly of claim 1, further comprising a flow control valve coupled to the micro-position gap sensor assembly such that displacement of the shaft changes a valve position of the flow control valve.

5. The micro-position gap sensor assembly of claim 1, further comprising one or more adjustment shims configured to align the first retainer within the structural housing.

6. The micro-position gap sensor assembly of claim 1, wherein the first retainer is a standoff washer including one or more standoffs configured to bias against the non-contact sensor plate defining the plane of the non-contact sensor plate.

7. The micro-position gap sensor assembly of claim 6, wherein the standoff washer is configured with a key tab configured to fit a slot within an interior wall of the structural housing and resist rotational torque applied to the standoff washer.

8. The micro-position gap sensor assembly of claim 1, wherein the second retainer is a wave washer including three or more wave peaks configured to bias against the non-contact sensor plate.

9. The micro-position gap sensor assembly of claim 1, further comprising a wave compression spring ring configured to bias against the second retainer.

10. The micro-position gap sensor assembly of claim 1, further comprising a jam retainer configured to fixedly attach to the shaft and bias against the conductive target plate.

11. The micro-position gap sensor assembly of claim 1, wherein the second retainer is an actuator return spring configured to generate the biasing force in opposition of the first retainer.

12. A micro-position gap sensor assembly comprising:
a structural housing;
a flexible diaphragm fixedly attached at a first end of the structural housing forming a barrier against fluid ingress into the structural housing;
a shaft orthogonally attached to the flexible diaphragm;
a first retainer including one or more standoffs;
a second retainer; and
a parallel plate gap sensor between the first retainer and the second retainer, the parallel plate gap sensor comprising:
   a non-contact sensor plate, the non-contact sensor plate biased against the one or more standoffs of the first retainer defining a plane of the non-contact sensor plate and biased against the second retainer;
   a target plate comprised of a conductive and paramagnetic material, wherein the target plate is secured to the shaft and oriented such that a plane of the target plate is parallel to the plane of the non-contact sensor plate; and
   a printed circuit board coupled to the non-contact sensor plate, the printed circuit board configured to output a signal indicating a distance between the non-contact sensor plate and the target plate.

13. The micro-position gap sensor assembly of claim 12, wherein the target plate is further comprised of a ceramic sleeve configured to electrically isolate the conductive and paramagnetic material from the shaft.

14. The micro-position gap sensor assembly of claim 12, further comprising a flow control valve coupled to the micro-position gap sensor assembly such that displacement of the shaft changes a valve position of the flow control valve.

15. The micro-position gap sensor assembly of claim 12, further comprising one or more adjustment shims configured to align the first retainer within the structural housing.

16. The micro-position gap sensor assembly of claim 12, wherein the first retainer is a standoff washer including three or more standoffs configured to bias against the non-contact sensor plate defining the plane of the non-contact sensor plate; and
wherein the first retainer includes a key tab configured to fit a slot on an interior wall of the structural housing and resist rotational torque applied to the first retainer.

17. The micro-position gap sensor assembly of claim 12, wherein the second retainer is a wave washer including three or more wave peaks configured to bias against the non-contact sensor plate.

18. The micro-position gap sensor assembly of claim 12, further comprising a wave compression spring ring configured to bias against the second retainer; and
wherein the wave compression spring ring includes a key tab configured to fit a slot on an interior wall of the structural housing and resist rotational torque applied to the wave compression spring ring.

19. The micro-position gap sensor assembly of claim 12, wherein the shaft is configured to change the distance between the target plate and the non-contact sensor plate.

20. A micro-position gap sensor assembly, comprising:
a structural housing;
a flexible diaphragm fixedly attached at a first end of the structural housing forming a barrier against fluid ingress into the structural housing;
a shaft orthogonally attached to the flexible diaphragm, wherein the shaft is configured with a shelf;
a first retainer;
an actuator return spring;
an actuator return spring compression member, the actuator return spring compression member coupled to the shaft;

wherein the actuator return spring compression member applies a compression force upon the actuator return spring and the first retainer;
a flow control valve coupled to the micro-position gap sensor assembly such that displacement of the shaft changes a valve position of the flow control valve; and
a parallel plate gap sensor supported at a first side by the first retainer and the shelf of the shaft and supported at a second side by the structural housing, the parallel plate gap sensor comprising a non-contact sensor plate, a target plate comprised of a conductive and paramagnetic material, and a printed circuit board coupled to the non-contact sensor plate, the printed circuit board configured to output a signal indicating a distance between the non-contact sensor plate and the target plate;
wherein the parallel plate gap sensor is biased against the first retainer at a first side such that a plane of the non-contact sensor plate and a plane of the target plate are parallel and forming a gap between the non-contact sensor plate and the target plate; and
wherein the parallel plate gap sensor is configured such that a change in the position of the shaft within the structural housing will result in a change in the distance of the gap between the target plate and the non-contact sensor plate.

21. A micro-position gap sensor assembly comprising:
a structural housing;
a flexible diaphragm fixedly attached at a first end of the structural housing forming a barrier against fluid ingress into the structural housing;
a shaft orthogonally attached to the flexible diaphragm;
a retainer; and
a plate gap sensor, the plate gap sensor comprising:
   a non-contact sensor plate, the non-contact sensor plate biased at a first side against a portion of the retainer and receiving a biasing force in opposition of the retainer from the structural housing; and
   a target plate positioned adjacent the non-contact sensor plate and separated therefrom by a gap;
   wherein the plate gap sensor is configured such that one of the target plate or non-contact sensor plate is coupled to the shaft and is configured to move with movement of the shaft, and wherein displacement of the one of the target plate or the non-contact sensor plate caused by movement of the shaft changes a distance between the target plate and the non-contact sensor plate, and wherein the biasing force biases the other of the target plate and non-contact sensor to thereby maintain the gap during the displacement.

* * * * *